United States Patent

Leheny et al.

[15] 3,636,354

[45] Jan. 18, 1972

[54] NEAR-INFRARED DETECTOR EMPLOYING CADMIUM TIN PHOSPHIDE

[72] Inventors: Robert Francis Leheny, Little Silver; Joseph Leo Shay, Marlboro, both of N.J.

[73] Assignee: Bell Telephone Laboratories Incorporated, Berkeley Heights, N.J.

[22] Filed: Mar. 23, 1970

[21] Appl. No.: 21,852

[52] U.S. Cl. ....................250/83.3 H, 250/83 R, 250/211 R, 252/501, 317/235 N

[51] Int. Cl. ..........................................G01j 5/28, G01j 5/20

[58] Field of Search........................250/83.3 H, 83 R, 211 R; 252/501; 317/235 N

[56] References Cited

OTHER PUBLICATIONS

Berkovskii et al.; Soviet Physics-Semiconductors; Vol. 2, 1969, p. 1027

*Primary Examiner*—James W. Lawrence
*Assistant Examiner*—Morton J. Frome
*Attorney*—R. J. Guenther and Arthur J. Torsiglieri

[57] ABSTRACT

There is disclosed a detector for near-infrared radiation employing a single crystal of cadmium tin phosphide, which is provided with electrodes and doped so that its effective bandgap at room temperature coincides in wavelength with the wavelength of the coherent light output of a neodymium ion solid-state laser. Photoconductive, PN junction-type, and barrier-layer-type detectors are disclosed. A modified device is useful as a saturable absorber for near-infrared light.

9 Claims, 4 Drawing Figures

INVENTORS R. F. LEHENY
J. L. SHAY
BY Wilford L. Wiener
ATTORNEY

NEAR-INFRARED DETECTOR EMPLOYING CADMIUM TIN PHOSPHIDE

BACKGROUND OF THE INVENTION

This invention relates to detectors for near-infrared radiation, particularly radiation in the vicinity of 1.06 μm.

Since the advent of the powerful continuous-wave laser employing neodymium ions in solid-state hosts such as a suitable glass or yttrium aluminum garnet, an intensive search has continued for improved detectors for coherent light at or near this infrared wavelength.

Silicon PN-junctions and S–1 photocathodes (for photomultipliers) represent the best alternatives at the present state of the art for the detection of low light levels at wavelengths near 1 micron. For room temperature operation, typical devices of those types have equivalent noise powers of about $1\times10^{-12}$ W., a value which is many orders of magnitude above the ultimate minimum set by background photon noise at 300° K. (27° C.).

The noise current in past silicon detectors is usually the shot noise of the bulk reverse leakage current. Depending upon the mechanism producing the reverse leakage, its magnitude can depend upon lifetime or mobility of the carriers, or upon the level of the doping. Regardless of the source of the bulk leakage, the reverse leakage current increases in direct relation to the intrinsic carrier concentration.

We have recognized that the intrinsic carrier concentration is inherently larger in an indirect bandgap semiconductor such as silicon than in a direct-bandgap semiconductor of comparable quality. The higher concentration in silicon is due, first, to the multiplicity of the conduction band minima in the energy-momentum relationships and, second, to the large anisotropy of the effective mass of the carriers. Moreover, reduction of background noise from photon noise at room temperature requires that the detector not respond to wavelengths significantly longer than the wavelengths to be detected.

SUMMARY OF THE INVENTION

We have discovered that cadmium tin phosphide ($CdSnP_2$), which is a chalcopyrite crystal in structure as well as a direct-bandgap semiconductor, has a bandgap wavelength, in appropriately doped samples at room temperature, which coincides with the wavelength of the neodymium laser.

Our experiments have shown very high quantum efficiency in photodetectors employing such crystals to which one ohmic and one rectifying contact have been made. Moreover, photoconductive detectors employing such crystals with two ohmic contacts have produced results consistent with the idea that all detectors of appropriately doped cadmium tin phosphide are capable of substantially greater efficiency than analogous prior art detectors employing silicon.

A detector according to our invention comprises a crystal body of cadmium tin phosphide and means including electrodes attached to the body for coupling an electrical response out of it in response to the incidence of near-infrared radiation at wavelengths equal to or shorter than the bandgap wavelength.

According to a specific feature of our invention, a PN-junction or a barrier layer rectifying contact is employed in such a detector to provide quantum efficiency approaching 100 percent at the effective bandgap wavelength, which is about 1.06 μm. at room temperature.

An advantage of our invention with respect to all of its embodiments is that its lower intrinsic carrier concentration provides a lower leakage current and therefore lower background noise than silicon detectors of comparable type. A conservative estimate is that the leakage current of cadmium tin phosphide detectors will be about 14 times smaller than the leakage current in silicon detectors.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
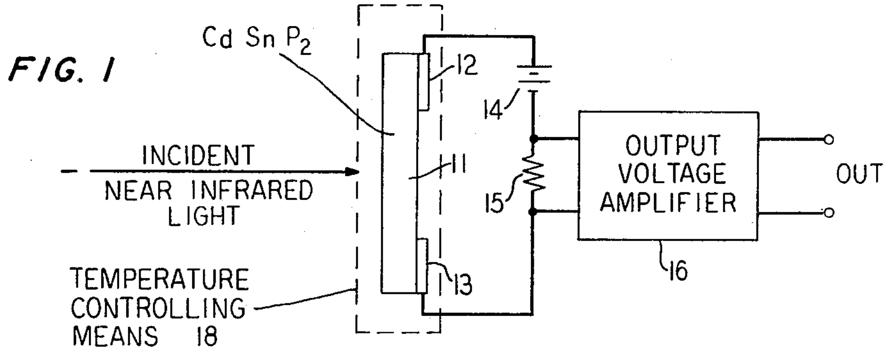
FIG. 1 is a partially pictorial and partially block diagrammatic illustration of a photoconductive embodiment of the invention.

In the embodiment of FIG. 1 it is desired to detect information which has been modulated onto a coherent light beam from a solid-state neodymium ion laser at 1.06 μm. The modulated beam is incident upon the detector from the left. The detector includes a single crystal 11 of cadmium tin phosphide which is illustratively an N-type undoped crystal with a resistivity of about 1 ohm-cm. The detector further includes the ohmic contacts 12 and 13 of alloyed tin which are connected to a direct current voltage source 14 and output resistor 15 in series therebetween. The voltage across output resistor 15 is amplified by an amplifier 16 which has its input connected across resistor 15.

More specifically, in several of our experiments the alloyed contacts 12 and 13 were alloyed into substantial areas of the crystal 11 on the surface opposite the surface upon which light was incident. The contacts 12 and 13 were alloyed into clean surfaces and made to have as low resistance as possible.

The dimensions of the crystal 11 were about 5 mm. by 2 mm. by 1 mm., with the long dimension in the direction between the contacts 12 and 13.

Illustratively, crystal 11 and its contacts were disposed in a temperature-controlling apparatus 18, such as a regulated oven, to maintain a temperature (e.g., 0°–60° C.) for which the bandgap of crystal 11 is between 1.055 and 1.065 μm.

In the operation of the photoconductive detector of FIG. 1, the response curve showed a relatively broad peak at 300° K. (27° C.) for wavelengths between about 1.05 and 1.08 μm. and was relatively flat from about 1.02 μm. to about 1.04 μm.

Since the overall efficiency of a photoconductive detector is always substantially less than that of a photovoltaic detector, it is of course preferred that such a rectifying photovoltaic form of our invention be employed. To this end, we have fabricated and tested several rectifying-type photovoltaic detectors which are of the types shown in FIGS. 2 and 3. The external circuitry for such detectors includes the output voltage amplifier 26 having its input connected between the ohmic contact 23 or 33, respectively, and the rectifying contact 22 or 32, respectively. Both of these photovoltaic detectors could be operated in reverse-biased modes but, as shown, are operated without externally imposed bias.

The dimensions of the crystals 21 and 31 are again 5 mm. by 2 mm. by 1 mm., with the long dimension between the contacts in each case.

Figure 2:
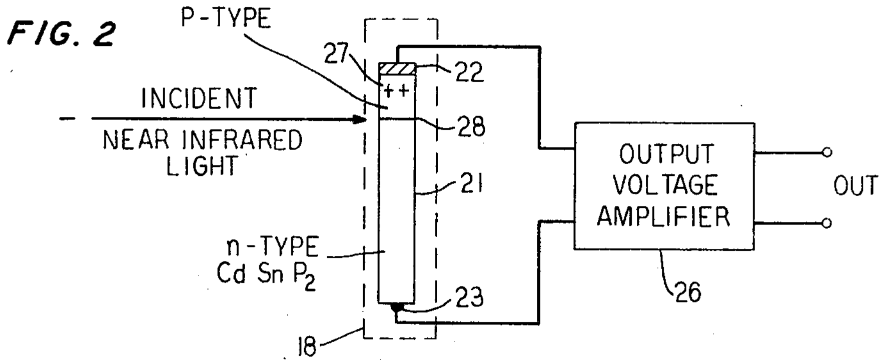
FIG. 2 is a partially pictorial and partially block diagrammatic illustration of a PN-junction embodiment of our invention.
Figure 3:
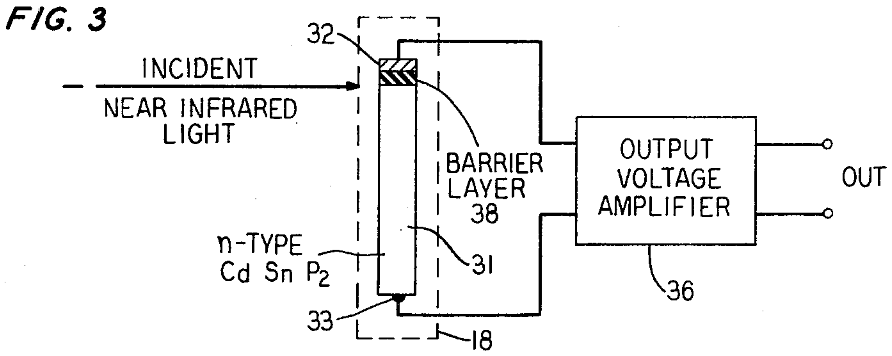
FIG. 3 is a partially pictorial and partially block diagrammatic illustration of a rectifying barrier layer embodiment.

In making the devices of FIGS. 2 and 3, one first selects the appropriate dopant for the bulk N-type region 21 or 31, respectively, which dopant is illustratively selenium or tellurium in very small concentrations.

The P-type region 27 of the device of FIG. 2 is formed by introducing into one surface of the single crystal 21 an appropriate acceptor impurity, such as gallium or indium. Other possibilities include the other column III elements and, in addition, tin, copper, silver, gold and column I elements including sodium.

We have successfully made rectifying contacts to N-type samples of cadmium tin phosphide by alloying a tin contact to each such sample to produce an impurity gradient with a relatively abrupt discontinuity, or junction, so that a potential barrier results. The ohmic contact 23 was also tin alloyed to a clean surface of the N-type bulk of the crystal under conditions producing as smooth an impurity gradient as possible. The connection to both contacts was made with copper wire. Many other metals can be used for making the ohmic contact.

As a specific alternative, the PN-junction is formed by diffusing a small amount of gallium into the crystal 21 to form a region 27. The diffusion is done by a conventional diffusion technique.

In the device of FIG. 3, the barrier layer contact 32 is formed if a suitable oxide film is present to serve as barrier layer 38. A potential barrier is created by this construction. The ohmic contact and both types of rectifying contacts, as well as possible other rectifying connections to the body of the crystal, may be referred to broadly as electrodes.

The dimensions of the crystal in the embodiments of FIGS. 2 and 3 were approximately 5 mm. by 2 mm. by 1 mm., with the long dimension between the contacts.

In actual operation of the devices of both FIGS. 2 and 3 at room temperature, the apparent quantum efficiency for detecting incident 1.06 $\mu$m. near-infrared light was good.

As an alternative fabrication technique for the device of FIG. 2, we suggest the following procedure. As appropriate for all of the embodiments, a single crystal is grown in an enclosed capsule from a solution having excess tin by slow cooling from about 850° C. After solidification, the excess tin is dissolved with mercury. Singly charged aluminum ions are then implanted at room temperature into the upper surface of crystal 21 by ion implantation techniques of the type known in the art, which are modified here in order to employ aluminum ions, or other small-diameter metallic ions such as boron.

To this end, the implantation illustratively can be performed at an energy equivalent to 95 kilo-electron volts, with a dose of $10^{15}$ ions per square centimeter. The ions should then be distributed through a layer 0.1 $\mu$m. deep in the crystal and with an average ion concentration of $10^{20}$ per cubic centimeter. Additional implantations at lower energies are helpful in smoothing the density profile.

To obtain good device performance, the device is then annealed in vacuum at 200° C.; alternatively, the annealing can be done at higher temperatures in an atmosphere of excess cadmium and phosphorus.

A more specific description of desirable parameters for a rectifying barrier layer-type device as shown in FIG. 3 is as follows:

In order for the barrier layer 38 to function efficiently to provide rectification in response to the near-infrared light, its thickness should be appropriate in relation to the device bias to provide tunneling in response to each photon of the incident 1.06 $\mu$m. near-infrared light. We suggest thicknesses of barrier layer 38 between 10 A. and 100 A. Such layers may be formed inherently during the growth of crystal 31 from solution or may be supplemented by an oxidation or "passivating" steps of the type well known in the fabrication of epitaxial silicon devices. We have found that a tin contact 32 is suitable for this type of device, although contact 32 could be almost any metal. After deposition of contact 32, the oxide should then be cleaned off the body of crystal 31 except in the vicinity of contact 32. The ohmic contact 33 can be either tin or alloys of gold with tellurium or selenium applied to a sufficiently clean surface.

In addition to the embodiments described above, we have found that coincidence of the effective bandgap of the single crystals of cadmium tin phosphide with the emission of the neodymium ion laser, particularly that employing an yttrium aluminum garnet host, is an attractive saturable absorber for limiting the level of such radiation or for providing passive Q-switching or mode-locking within the laser resonator. Such a modified embodiment is shown in FIG. 4.

Figure 4:
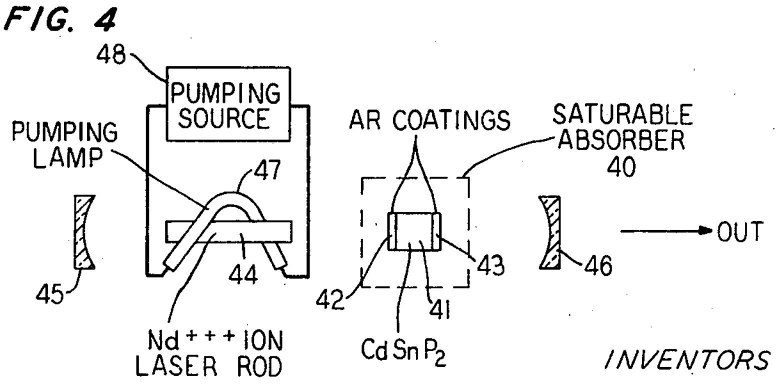
FIG. 4 is a partially pictorial and partially block diagrammatic illustration of another embodiment embodying $CdSnP_2$ as a saturable absorber at wavelengths near 1.06 μm. at room temperature.

In FIG. 4, the nearly intrinsic crystal 41 of cadmium tin phosphide grown without intentionally added doping impurities is provided with the antireflection coating 42 or 43 on parallel opposed major surfaces. The crystal 41 plus its coatings, which are preferably orthogonal to the $z$-crystalline axis, together form the saturable absorbing device 40 which is disposed in the resonator of a neodymium ion laser including the active rod 44 of neodymium ions in an yttrium aluminum garnet host. Device 40 may also include temperature-controlling means like apparatus 18 of FIGS. 1 and 2. The laser is pumped by the pumping lamp 47 energized from the electrical pumping source 48. The rod 44 is aligned with its long dimension along the axis of the optical resonator formed by the separate end reflectors 45 and 46 of known type. Reflector 46 is partially transmissive to permit extraction of a portion of the coherent light. The saturable absorber 40 is positioned on the optical axis of the resonator with the $z$-crystalline axis of crystal 41 aligned with the resonator axis to avoid double refraction and ellipticity of the polarization. When the pumping power level of source 48 is sufficiently high for continuous-wave operation in several modes, a sufficiently small dimension of crystal 41 between reflectors 42 and 43, e.g., about 0.1 mm., depending upon the absorption coefficient at 1.06 micrometers, will force mode-locking of the multiple modes so that a train of pulses is obtained as the output. The pulses have a characteristic repetition frequency equal to the mode separation frequency $c/2L$ of the laser resonator, where $c$ is the velocity of light and L is the separation of the end reflectors. When the dimension of crystal 41 is somewhat longer between coating 42 and 43, giant-pulse Q-switching will occur under similar conditions.

We claim:

1. A detector for near-infrared radiation, comprising
a crystalline body of calcium tin phosphide ($CdSnP_2$),
means including electrodes attached to said body for coupling an electrical response out of said body in response to the incidence of near-infrared radiation thereon and means for maintaining the body of calcium tin phosphide at a temperature at which the bandgap wavelength of said body is between 1.055 and 1.065 micrometers.

2. A detector according to claim 1 in which the bulk of the body of cadmium tin phosphide is an N-type chalcopyrite crystalline structure having resistivity in the range from 0.1 ohm-centimeter to 10 ohm-centimeters and having a direct bandgap, said detector including means for maintaining said body at a temperature between about 0° Centigrade and 60° Centigrade.

3. A detector according to claim 2 in which the coupling means includes a P-type region and a PN-junction within the body, one of the electrodes making an ohmic contact to the N-type bulk and the other of said electrodes making an ohmic contact to said P-type region.

4. A detector according to claim 1 in which the coupling means includes P-type and N-type regions in said body and a PN-junction between said regions, one of the electrodes making an ohmic contact to said N-type region and the other of the electrodes making an ohmic contact to said P-type region.

5. A detector according to claim 1 in which the electrodes make ohmic contacts to said body in positions for responding to photoconductivity in said body in response to near-infrared radiation, and the coupling means includes an external source of voltage connected between said electrodes and means for sensing variations in current flowing between said electrodes through said source.

6. A detector according to claim 1 in which the bulk of the body of cadmium tin phosphide is an N-type chalcopyrite crystalline structure and one of the electrodes makes an ohmic contact to said body, the other of said electrodes making a rectifying contact with said body.

7. A photoconductive detector for near-infrared radiation of wavelength in the vicinity of 1.06 micrometers at a temperature near 20° Centigrade comprising
an N-type chalcopyrite single crystal of cadmium tin phosphide ($CdSnP_2$) having a resistivity of at least about 1 ohm-centimeter, and
means including electrodes making spaced ohmic contacts to said single crystal and a direct current voltage source connected between said electrodes for coupling a current out of said body in a direct relationship to the intensity of said near-infrared radiation incident thereon.

8. A saturable absorber for near-infrared radiation of vacuum wavelength in the vicinity of 1.06 micrometers at a temperature near 20° Centigrade, comprising an N-type chalcopyrite single crystal of cadmium tin phosphide ($CdSnP_2$) having a direct bandgap and a resistivity of at least about 1 ohm-centimeter, and a pair of optically smooth major surfaces of said body intercepting the *z*-crystalline axis of said body, whereby said radiation can be transmitted along said axis without double refraction and ellipticity of the polarization.

9. A saturable absorber according to claim 8 in which the major surfaces of the body are parallel and are antireflection-coated for the 1.06 micrometer radiation.

* * * * *